US 11,912,134 B2

(12) United States Patent
Andou et al.

(10) Patent No.: US 11,912,134 B2
(45) Date of Patent: Feb. 27, 2024

(54) HYBRID VEHICLE

(71) Applicant: KAWASAKI MOTORS, LTD., Akashi (JP)

(72) Inventors: Shou Andou, Akashi (JP); Koshi Fusazaki, Akashi (JP); Motoki Miyakoshi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/998,384

(22) PCT Filed: May 12, 2020

(86) PCT No.: PCT/JP2020/018972
§ 371 (c)(1),
(2) Date: Nov. 10, 2022

(87) PCT Pub. No.: WO2021/229685
PCT Pub. Date: Nov. 18, 2021

(65) Prior Publication Data
US 2023/0182559 A1    Jun. 15, 2023

(51) Int. Cl.
*B60K 6/48* (2007.10)
*B60K 6/54* (2007.10)
*F16H 57/04* (2010.01)
*B60K 6/547* (2007.10)

(52) U.S. Cl.
CPC ............... *B60K 6/48* (2013.01); *B60K 6/547* (2013.01); *F16H 57/0424* (2013.01); *F16H 57/0435* (2013.01); *F16H 57/0475* (2013.01); *B60Y 2200/12* (2013.01); *B60Y 2306/03* (2013.01)

(58) Field of Classification Search
CPC ....... B60K 6/48; B60K 6/547; F16H 57/0424; F16H 57/0435; F16H 57/0475; B60Y 2200/12; B60Y 2306/03
See application file for complete search history.

(56) References Cited

U.S. PATENT DOCUMENTS

| | | | |
|---|---|---|---|
| 2010/0243348 A1 | 9/2010 | Nomura et al. | |
| 2013/0260929 A1* | 10/2013 | Aoyama | B60W 10/06 474/29 |

FOREIGN PATENT DOCUMENTS

| | | | |
|---|---|---|---|
| JP | 5339606 B2 | 11/2013 | |
| JP | 2019123387 A | * 7/2019 | |

* cited by examiner

*Primary Examiner* — Audrey B. Walter
(74) *Attorney, Agent, or Firm* — Alleman Hall & Tuttle LLP

(57) ABSTRACT

A hybrid vehicle includes: an oil passage including a common oil passage through which lubricating oil discharged from an oil pump flows, an engine lubricating oil passage extending from the common oil passage toward an engine internal space, and a transmission lubricating oil passage extending from the common oil passage toward a transmission internal space; and a variable throttle valve that can change a flow rate in the transmission lubricating oil passage. The variable throttle valve increases an opening degree of the variable throttle valve in a mode transition in which a first traveling mode in which the hybrid vehicle travels by driving power of an engine transitions to a second traveling mode in which the hybrid vehicle stops the engine and travels by the driving power of the electric motor.

5 Claims, 4 Drawing Sheets

HYBRID VEHICLE

CROSS REFERENCE TO RELATED APPLICATIONS

This application is a national phase application of International Application No. PCT/JP2020/018972, filed on May 12, 2020, entitled HYBRID VEHICLE, the entire disclosure of which is incorporated herein by reference for all purposes.

TECHNICAL FIELD

The present disclosure relates to a hybrid vehicle.

BACKGROUND ART

Known is a hybrid vehicle including a first transmitting route through which rotational power is transmitted from an engine through a first one-way clutch to an oil pump and a second transmitting route through which rotational power is transmitted from an electric motor through a second one-way clutch to the oil pump (see PTL 1, for example). According to this, even when any one of the engine and the electric motor stops, the oil pump is mechanically driven, and lubricating oil is supplied to the engine and a transmission.

CITATION LIST

Patent Literature

PTL 1: Japanese Patent No. 5339606

SUMMARY OF INVENTION

Technical Problem

However, even when the hybrid vehicle stops the engine and travels by driving power of the electric motor, the lubricating oil is supplied from the oil pump to the engine and the transmission. When supplying the lubricating oil to the engine, high hydraulic pressure is necessary for a piston jet and the like. Therefore, the oil pump has to do needless work, and energy loss occurs.

An object of one aspect of the present disclosure is to reduce energy loss of a hybrid vehicle when the hybrid vehicle stops an engine and travels by driving power of an electric motor.

Solution to Problem

A hybrid vehicle according to one aspect of the present disclosure includes: an engine including an engine internal space; an electric motor; a transmission that includes an input shaft, an output shaft, a gear train located at the input shaft and the output shaft, and a transmission internal space in which the gear train is located, and changes speed of rotational power transmitted from the engine and the electric motor to the input shaft and outputs the rotational power to a driving wheel; an oil pump driven by the rotational power from the engine and the electric motor; an oil passage including a common oil passage through which lubricating oil discharged from the oil pump flows, an engine lubricating oil passage extending from the common oil passage toward the engine internal space, and a transmission lubricating oil passage extending from the common oil passage toward the transmission internal space; and a variable throttle valve that changes a flow rate in the transmission lubricating oil passage and increases an opening degree of the variable throttle valve in a mode transition in which a first traveling mode in which the hybrid vehicle travels by driving power of the engine transitions to a second traveling mode in which the hybrid vehicle stops the engine and travels by the driving power of the electric motor.

According to the above configuration, when the first traveling mode transitions to the second traveling mode, the opening degree of the variable throttle valve increases. With this, while supplying the lubricating oil to the transmission internal space that is lower in the degree of sealing than the engine internal space, the pressure of the common oil passage is lowered. Thus, the amount of work of the oil pump can be reduced. Moreover, when the second traveling mode transitions to the first traveling mode, the opening degree of the variable throttle valve decreases. With this, while supplying the lubricating oil to the transmission internal space, the lubricating oil can be supplied to the engine internal space having a high sealing property. Therefore, the energy loss of the hybrid vehicle when the hybrid vehicle stops the engine and travels by the driving power of the electric motor can be reduced.

Advantageous Effects of Invention

The present disclosure can reduce the energy loss of the hybrid vehicle when the hybrid vehicle stops the engine and travels by the driving power of the electric motor.

DESCRIPTION OF EMBODIMENTS

Hereinafter, embodiments will be described with reference to the drawings.

Embodiment 1

Figure 1:
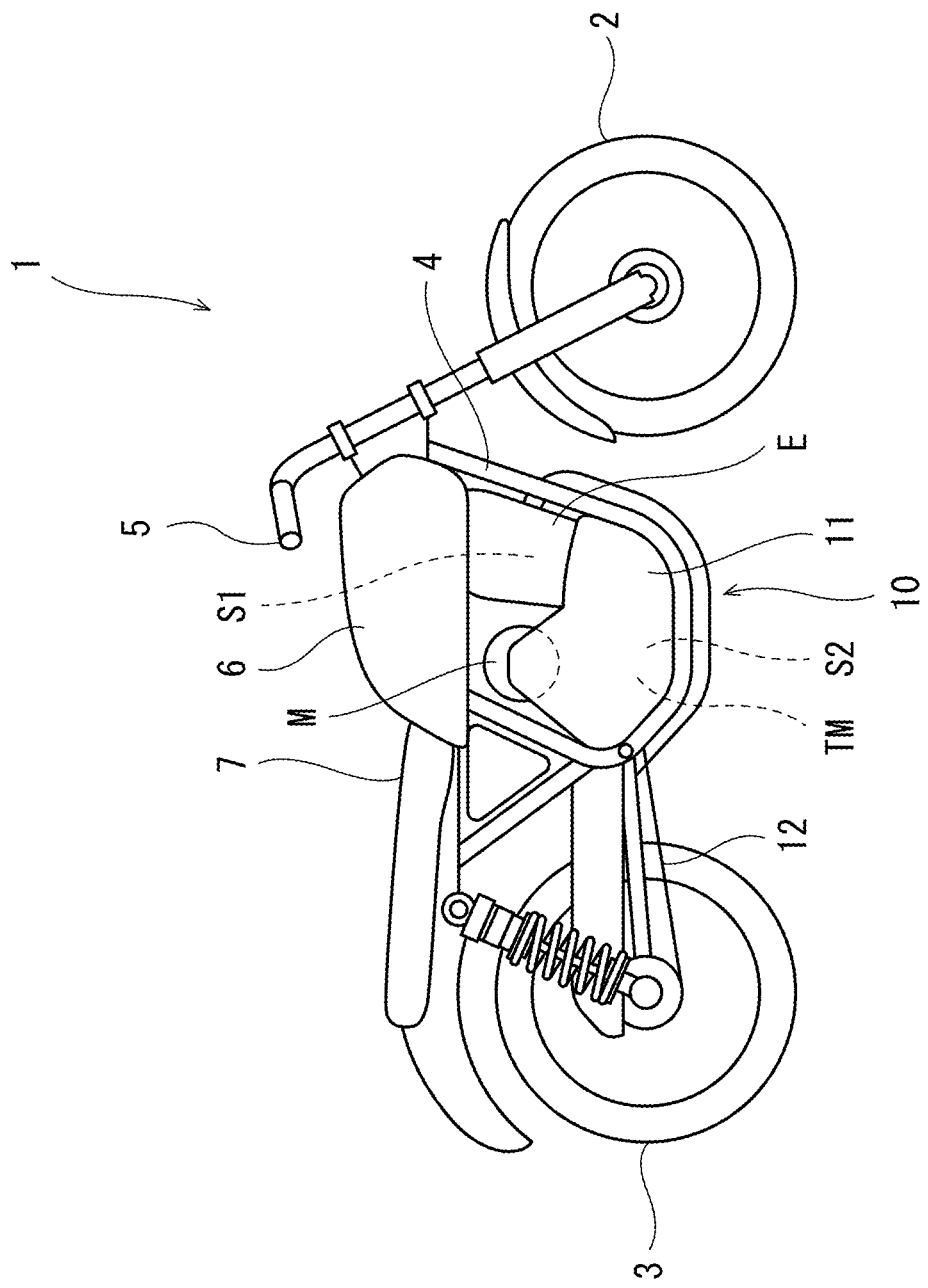
FIG. 1 is a side view of a motorcycle according to Embodiment 1.

FIG. 1 is a side view of a motorcycle 1 according to Embodiment 1. As shown in FIG. 1, the motorcycle 1 is one example of a straddle vehicle straddled by a rider, and is a hybrid vehicle. The motorcycle 1 includes a front wheel 2, a rear wheel 3 (driving wheel), and a vehicle body frame 4. The front wheel 2 is steered in association with the manipulation of a handle 5 that is supported by the vehicle body frame 4 so as to be turnable. A fuel tank 6 is located behind the handle 5. A seat 7 on which the rider is seated is located behind the fuel tank 6. A power unit 10 as a driving power source is mounted on the vehicle body frame 4 so as to be located between the front wheel 2 and the rear wheel 3.

The power unit 10 includes an engine E and a driving motor M as prime movers. The engine E is an internal combustion engine, and the driving motor M is an electric motor. A piston 21 (see FIG. 2) is in a cylinder of the engine E. An internal space of the cylinder of the engine E is an engine internal space 51. A crank case 11 extending rearward is located at a lower portion of the engine E. The crank case 11 houses a transmission TM. An internal space of the crank case 11 is a transmission internal space S2. Driving power output from the transmission TM is transmitted to the rear wheel 3 through an output transmitting structure 12 (for example, a chain, a belt, a drive shaft, or the like).

Figure 2:
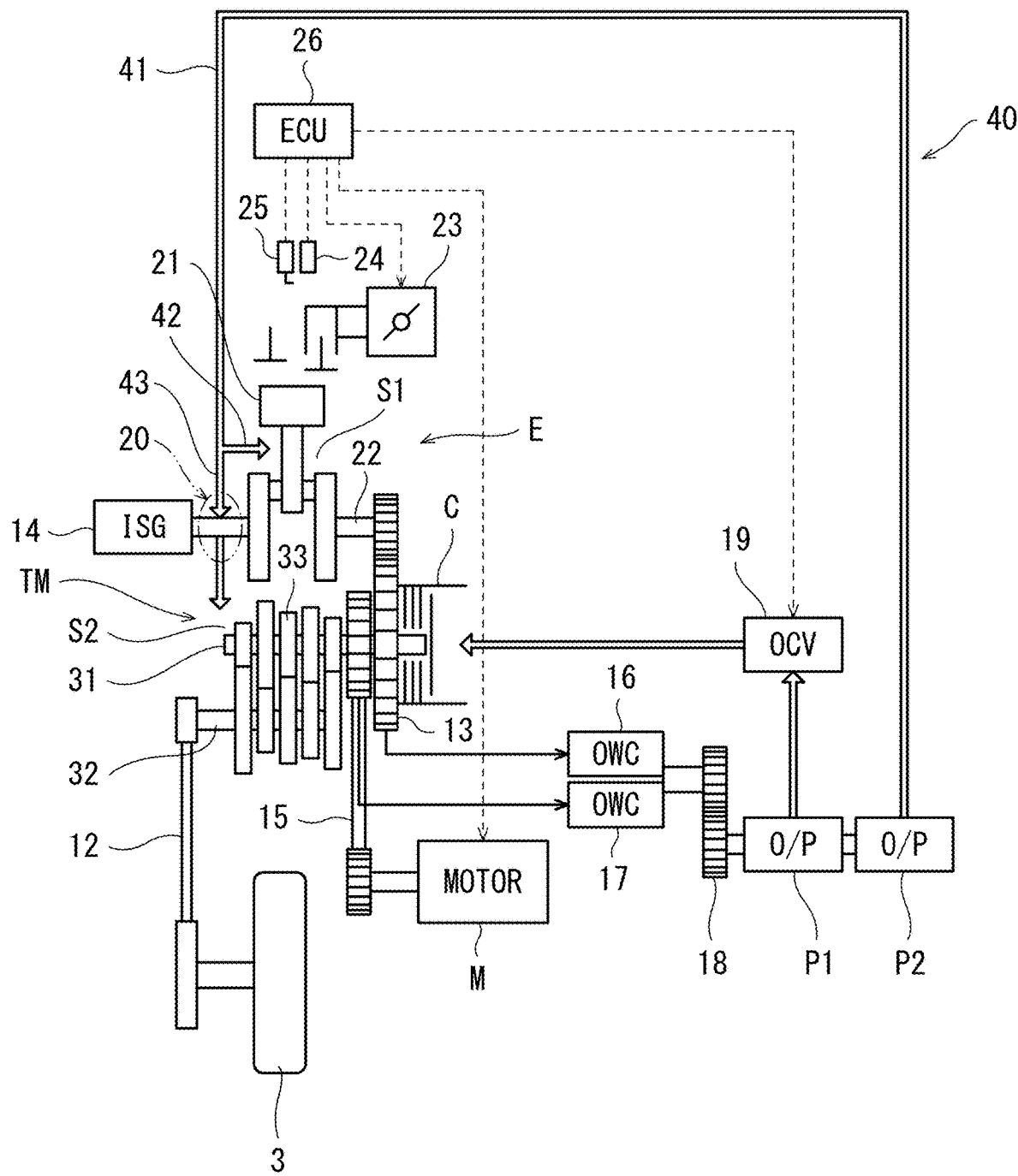
FIG. 2 is a schematic diagram of a power system of the motorcycle shown in FIG. 1.

FIG. 2 is a schematic diagram of a power system of the motorcycle 1 shown in FIG. 1. As shown in FIG. 2, the engine E includes the piston 21 and a crank shaft 22 that rotates in association with reciprocation of the piston 21. The crank shaft 22 is one example of a power transmitting shaft. A throttle 23, a fuel supplier 24, and an ignitor 25 are located at the engine E. The throttle 23 adjusts the amount of intake air. The fuel supplier 24 mixes the intake air with fuel. The ignitor 25 ignites the fuel-air mixture in a combustion chamber of the engine E.

The transmission TM includes an input shaft 31, an output shaft 32, and plural pairs of transmission gear trains 33 whose reduction ratios are different from each other. The transmission TM can transmit power from the input shaft 31 through the transmission gear trains 33 to the output shaft 32. The transmission TM performs speed change by selecting any one of the transmission gear trains 33. For example, the transmission TM is a dog clutch transmission. The driving power of the output shaft 32 is transmitted through the output transmitting structure 12 to the rear wheel 3.

One end portion of the crank shaft 22 of the engine E is connected to a primary reduction gear 13 such that the crank shaft 22 can transmit power to the primary reduction gear 13. The other end portion of the crank shaft 22 is connected to an integrated starter generator 14 (hereinafter referred to as an "ISG 14") such that the crank shaft 22 can transmit power to the ISG 14. The ISG 14 serves as a below-described phase adjuster. The driving power of the crank shaft 22 is transmitted to the input shaft 31 through the primary reduction gear 13 and a clutch C.

The clutch C is located at one end portion of the input shaft 31 and cuts or establishes a power route extending from the crank shaft 22 to the input shaft 31. The clutch C is a friction clutch. The clutch C operates by hydraulic pressure but may operate by electric power. The driving power of the driving motor M is transmitted to the input shaft 31 through a power transmitting structure 15 (for example, a chain-sprocket structure, a gear structure, a pulley-belt structure, or the like). A clutch pump P1 and a lubricating oil pump P2 are located in the vicinity of the input shaft 31 and are mechanically driven in association with the rotation of the input shaft 31.

Specifically, the driving power of the engine E is transmitted to a first one-way clutch 16. The driving power of the driving motor M is transmitted to a second one-way clutch 17. The first one-way clutch 16 and the second one-way clutch 17 are connected to the clutch pump P1 and the lubricating oil pump P2 through a power transmitting structure 18 such that the first one-way clutch 16 and the second one-way clutch 17 can transmit power to the clutch pump P1 and the lubricating oil pump P2. The first one-way clutch 16 and the second one-way clutch 17 are located in parallel with each other. The first one-way clutch 16 and the second one-way clutch 17 are connected to the power transmitting structure 18 so as to meet at the power transmitting structure 18.

To be specific, the driving power of the engine E is transmitted to the clutch pump P1 and the lubricating oil pump P2 through the first one-way clutch 16 and the power transmitting structure 18, and the driving power of the driving motor M is transmitted to the clutch pump P1 and the lubricating oil pump P2 through the second one-way clutch 17 and the power transmitting structure 18. When both the engine E and the electric motor M are driving, the driving power of the prime mover that is higher in rotational frequency between the engine E and the electric motor M is transmitted to the clutch pump P1 and the lubricating oil pump P2 through the power transmitting structure 18 by the actions of the first one-way clutch 16 and the second one-way clutch 17.

Oil discharged from the clutch pump P1 is supplied through an oil control valve unit 19 to the clutch C as operating oil. The oil control valve unit 19 operates the clutch C by opening or closing a passage of oil flowing from the clutch pump P1 toward the clutch C. To be specific, the oil control valve unit 19 is one example of a clutch actuator. The oil discharged from the lubricating oil pump P2 is supplied through an oil passage 40 to the engine internal space S1 and the transmission internal space S2 as lubricating oil. A filter that removes foreign matters may be located at the oil passage 40.

The oil passage 40 includes a common oil passage 41, an engine lubricating oil passage 42, and a transmission lubricating oil passage 43. The lubricating oil discharged from the lubricating oil pump P2 flows through the common oil passage 41. The engine lubricating oil passage 42 extends from the common oil passage 41 toward the engine internal space S1. To be specific, the oil flowing out from the engine lubricating oil passage 42 is discharged into the engine internal space S1 and lubricates the engine E. The transmission lubricating oil passage 43 extends from the common oil passage 41 toward the transmission internal space S2.

To be specific, the oil flowing out from the transmission lubricating oil passage 43 is discharged into the transmission internal space S2 and lubricates the transmission TM. The degree of sealing of the engine internal space S1 is higher than the degree of sealing of the transmission internal space S2. Therefore, oil pressure necessary to discharge the oil from the engine lubricating oil passage 42 to the engine internal space S1 is higher than oil pressure necessary to discharge the oil from the transmission lubricating oil passage 43 to the transmission internal space S2. A variable throttle valve 20 is located at the transmission lubricating oil passage 43 and can change a flow rate in the transmission lubricating oil passage 43. The configuration of the variable throttle valve 20 will be described later.

An ECU 26 (electronic control unit) controls the engine E. Specifically, the ECU 26 controls the throttle 23, the fuel supplier 24, and the ignitor 25. The ECU 26 controls the electric motor M. The ECU 26 controls engagement and disengagement of the clutch C by controlling the oil control valve unit 19. The ECU 26 switches among an engine traveling mode (first mode), an EV mode (second mode), and an HEV mode (first mode).

The engine traveling mode is a mode in which: the clutch C is in an engaged state; the electric motor M is in a stop state; and the motorcycle 1 travels by the driving power of the engine E. The EV traveling mode is a mode in which: the clutch C is in a disengaged state; the engine E is in a stop state; and the motorcycle 1 travels by the driving power of the electric motor M. The HEV mode is a mode in which: the clutch C is in the engaged state; and the motorcycle 1 travels by both of the driving power of the engine E and the driving power of the electric motor M.

Figure 3:
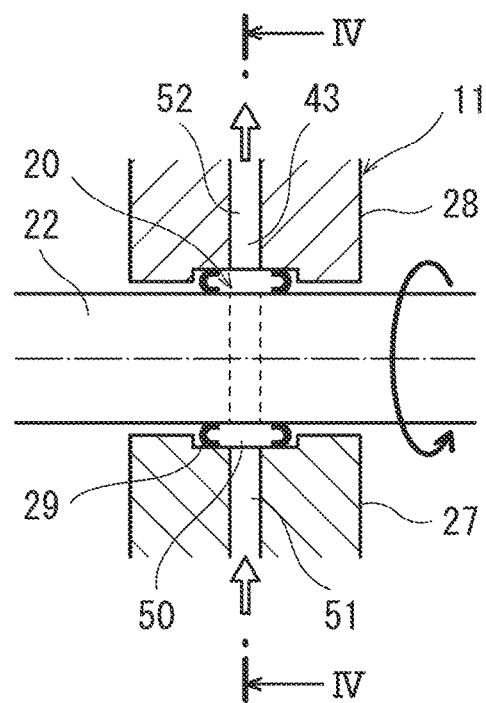
FIG. 3 is a sectional view of a variable throttle valve of the power system shown in FIG. 2.
Figure 4:
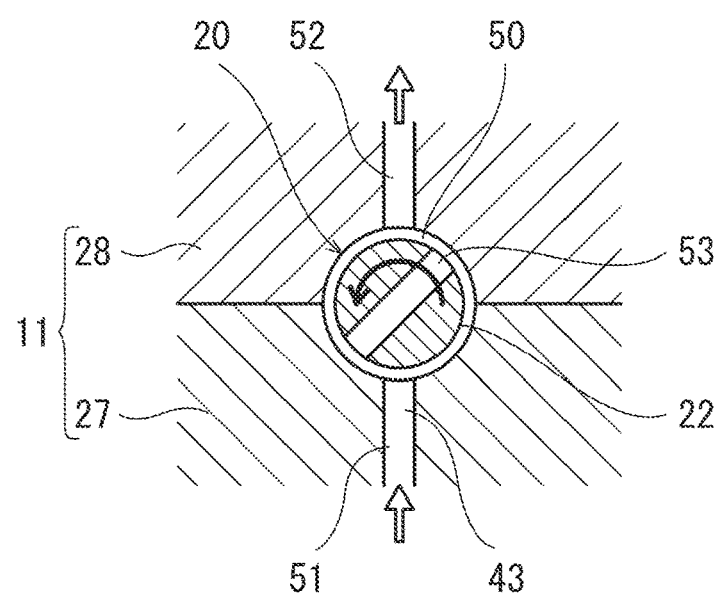
FIG. 4 is a sectional view taken along line IV-IV of FIG. 3.
Figure 5:
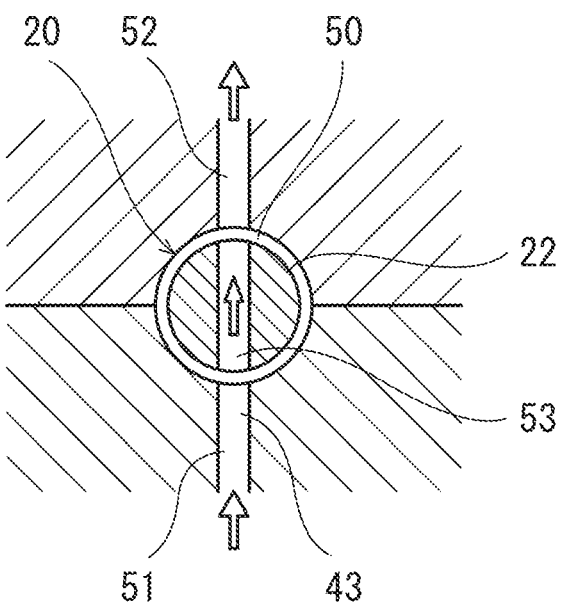
FIG. 5 is a sectional view showing the variable throttle valve of FIG. 4 in an engine stop state.

FIG. 3 is a sectional view of the variable throttle valve 20 of the power system shown in FIG. 2. FIG. 4 is a sectional view taken along line IV-IV of FIG. 3. FIG. 5 is a sectional view showing the variable throttle valve 20 of FIG. 4 in an engine stop state. As shown in FIGS. 3 and 4, the crank case 11 includes a lower case 27 and an upper case 28. The upper case 28 is assembled to the lower case 27 in an upper-lower direction such that an axial portion of the crank shaft 22 is sandwiched between the lower case 27 and the upper case 28. With this, an outer peripheral surface of the axial portion of the crank shaft 22 is covered with the crank case 11.

An annular gap 50 is between the crank shaft 22 and the crank case 11. A pair of annular oil seals 29 sandwiched between the crank case 11 and the crank shaft 22 are located at both sides of the annular gap 50 in the axial direction of the crank shaft 22.

The lower case 27 includes an inflow passage 51 that communicates with the common oil passage 41 (see FIG. 2) and faces the annular gap 50. The upper case 28 includes an outflow passage 52 that communicates with the transmission internal space S2 (see FIG. 2) and faces the annular gap 50. The crank shaft 22 includes a through hole 53 that extends in a radial direction of the crank shaft 22 and faces the annular gap 50. The inflow passage 51, the annular gap 50, the through hole 53, and the outflow passage 52 are included in the transmission lubricating oil passage 43. The annular gap 50 and the crank shaft 22 are included in the variable throttle valve 20. The crank shaft 22 is an association body that operates in association with the power transmitting shaft (for example, the input shaft 31) that rotates when the engine E drives.

When the engine E drives in the engine traveling mode or the HEV mode, the crank shaft 22 rotates at high speed. Therefore, the oil flowing from the inflow passage 51 toward the outflow passage 52 cannot flow through the through hole 53 of the crank shaft 22 but flows through only the annular gap 50. Therefore, the opening degree of the variable throttle valve 20 depends only on the size of the annular gap 50. Thus, the opening degree of the variable throttle valve 20 is small.

As a result, by a restriction effect of the variable throttle valve 20, the oil hardly flows through the transmission lubricating oil passage 43, and the oil pressure of the engine lubricating oil passage 42 increases. Thus, the oil is adequately supplied to the engine internal space S1 while supplying the oil to the transmission internal space S2.

On the other hand, as shown in FIG. 5, when the engine E stops in the EV mode, the crank shaft 22 stops. When stopping the engine E, the ISG 14 is controlled by the ECU 26 such that the crank shaft 22 stops in a phase in which the through hole 53 coincides with the inflow passage 51 and the outflow passage 52. To be specific, the ISG 14 is one example of a phase adjuster that adjusts the phase of the crank shaft 22.

In this state, the oil flowing from the inflow passage 51 toward the outflow passage 52 flows through not only the annular gap 50 but also the through hole 53 of the crank shaft 22. Therefore, the opening degree of the variable throttle valve 20 when the engine E is in a stop state is larger than the opening degree of the variable throttle valve 20 when the engine E drives. In other words, the variable throttle valve 20 decreases the opening degree when the crank shaft 22 rotates, and increases the opening degree when the crank shaft 22 stops. Therefore, the opening degree of the variable throttle valve 20 increases by a state change of the crank shaft 22, the state change being caused by a mode transition in which the engine traveling mode or the HEV mode transitions to the EV traveling mode.

As a result, the oil easily flows through the transmission lubricating oil passage 43, and the oil pressure of the engine lubricating oil passage 42 decreases. Thus, the supply of the oil to the engine internal space S1 is suppressed. To be specific, the oil discharged by the lubricating oil pump P2 and flowing through the oil passage 40 is hardly supplied to the engine internal space S1 but is supplied to the transmission internal space S2. Therefore, the load of the lubricating oil pump P2 is reduced.

According to the above-described configuration, when the engine traveling mode or the HEV mode transitions to the EV traveling mode, the opening degree of the variable throttle valve 20 increases. With this, while supplying the lubricating oil to the transmission internal space S2 that is lower in the degree of sealing than the engine internal space S1, the pressure of the common oil passage 41 is lowered. Thus, the amount of work of the lubricating oil pump P2 can be reduced. Moreover, when the EV traveling mode transitions to the engine traveling mode or the HEV mode, the opening degree of the variable throttle valve 20 decreases. With this, while supplying the lubricating oil to the transmission internal space S2, the lubricating oil can be supplied to the engine internal space S1 having a high sealing property. Therefore, the energy loss of the motorcycle 1 when the motorcycle 1 stops the engine E and travels by the driving power of the electric motor M can be reduced.

Moreover, since the opening degree of the variable throttle valve 20 increases by the state change of the crank shaft 22 which is caused by the mode transition, the variable throttle valve 20 can be realized while suppressing the addition of on-vehicle parts. Specifically, the variable throttle valve 20 decreases the opening degree when the crank shaft 22 rotates, and increases the opening degree when the crank shaft 22 stops. Therefore, the variable throttle valve 20 can be realized while suppressing an increase of an occupied space of parts.

Moreover, when stopping the crank shaft 22, the ISG 14 as the phase adjuster brings the crank shaft 22 into a phase in which the through hole 53 coincides with the inflow passage 51 and the outflow passage 52. Therefore, when stopping the crank shaft 22, the opening degree of the variable throttle valve 20 can be stably increased.

The power transmitting shaft included in the variable throttle valve 20 is not limited to the crank shaft 22. For example, the power transmitting shaft included in the variable throttle valve 20 may be a balancer shaft that is an association body that operates in association with the power transmitting shaft (for example, the crank shaft 22) that rotates when the engine E drives.

Embodiment 2

Figure 6:
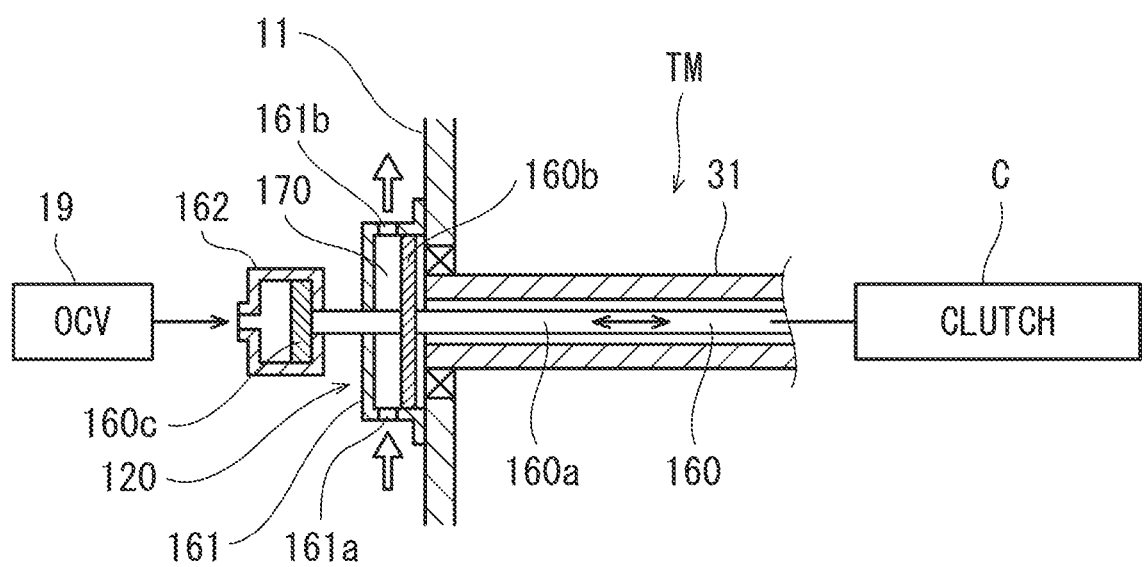
FIG. 6 is a sectional view showing the variable throttle valve and its vicinity in the motorcycle according to Embodiment 2.

FIG. 6 is a sectional view showing a variable throttle valve 120 and its vicinity in the motorcycle according to Embodiment 2. The same reference signs are used for the same components as in Embodiment 1, and the repetition of the same explanation is avoided. As shown in FIG. 6, the input shaft 31 of the transmission TM is a hollow pipe, and a rod portion 160a of a rod 160 is inserted into the input shaft 31. One end of the rod portion 160a is connected to a piston of the clutch C, and a piston portion 160c is located at the other end portion of the rod 160b.

The piston portion 160c is housed in a cylinder 162. The piston portion 160c moves in the cylinder 162 by the hydraulic pressure supplied from the oil control valve unit 19. The clutch C operates by the movement of the rod 160 that moves in the axial direction by the hydraulic pressure supplied from the oil control valve unit 19. To be specific, the rod 160 is an association body that moves in the axial direction in association with the clutch C.

The rod 160 includes a valve element portion 160b that projects from the rod portion 160a in a radial direction. The valve element portion 160b is housed in a valve housing 161 connected to the crank case 11. The valve housing 161 includes an inflow opening 161a and an outflow opening 161b. The inflow opening 161a communicates with the common oil passage 41 (see FIG. 2) and faces an oil space 170 inside the valve housing 161. The outflow opening 161b communicates with the transmission internal space S2 (see FIG. 2) and faces the oil space 170 inside the valve housing 161. In the present embodiment, the rod 160 and the valve housing 161 are included in the variable throttle valve 120. The variable throttle valve 120 is located at the transmission lubricating oil passage 43 (see FIG. 2).

When the engine E drives in the engine traveling mode or the HEV mode, the rod 160 is moved (leftward in FIG. 6) by the oil control valve unit 19 controlled by the ECU 26 such that the clutch C becomes the engaged state. When the clutch C is in the engaged state, the valve element portion 160b is located at such a position as to partially close at least one of the inflow opening 161a or the outflow opening 161b. Thus, the opening degree of the variable throttle valve 120 decreases.

As a result, by the restriction effect of the variable throttle valve 120, the oil hardly flows through the transmission lubricating oil passage 43 (see FIG. 2), and the oil pressure of the engine lubricating oil passage 42 (see FIG. 2) increases. Thus, the oil is adequately supplied to the engine internal space S1 while supplying the oil to the transmission internal space S2 (see FIG. 2).

On the other hand, when the engine E stops in the EV mode, the rod 160 is moved (rightward in FIG. 6) by the oil control valve unit 19 controlled by the ECU 26 such that the clutch C becomes the disengaged state. When the clutch C is in the disengaged state, the valve element portion 160b is located at such a position as to fully open the inflow opening 161a and the outflow opening 161b. Thus, the opening degree of the variable throttle valve 120 increases.

As a result, the oil easily flows through the transmission lubricating oil passage 43 (see FIG. 2), and the oil pressure of the engine lubricating oil passage 42 (see FIG. 2) decreases. Thus, the supply of the oil to the engine internal space S1 (see FIG. 2) is suppressed. To be specific, the oil discharged by the lubricating oil pump P2 (see FIG. 2) and flowing through the oil passage 40 (see FIG. 2) is hardly supplied to the engine internal space S1 (see FIG. 2) but is supplied to the transmission internal space S2 (see FIG. 2). Therefore, the load of the lubricating oil pump P2 is reduced.

As above, the opening degree of the variable throttle valve 120 changes by the movement of the valve element portion 160b that moves by the movement of the rod 160, and the opening degree of the variable throttle valve 120 increases by the state change of the rod 160 which is caused by the mode transition. Therefore, the variable throttle valve 120 can be realized while suppressing an increase of an occupied space of parts.

The invention claimed is:

1. A hybrid vehicle comprising:
an engine including an engine internal space;
an electric motor;
a transmission that
includes an input shaft, an output shaft, a gear train located at the input shaft and the output shaft, and a transmission internal space in which the gear train is located, and
is configured to change speed of rotational power transmitted from the engine and the electric motor to the input shaft and output the rotational power to a driving wheel;
an oil pump configured to be driven by the rotational power from the engine and the electric motor;
an oil passage including:
a common oil passage configured to have lubricating oil discharged from the oil pump flow therethrough,
an engine lubricating oil passage extending from the common oil passage toward the engine internal space, and
a transmission lubricating oil passage extending from the common oil passage toward the transmission internal space; and
a variable throttle valve that is configured to change a flow rate in the transmission lubricating oil passage and increase an opening degree of the variable throttle valve in a mode transition in which a first traveling mode in which the hybrid vehicle travels by driving power of the engine transitions to a second traveling mode in which the hybrid vehicle stops the engine and travels by the driving power of the electric motor.

2. The hybrid vehicle according to claim 1, further comprising:
a clutch located between the engine and the transmission;
a clutch actuator that is configured to operate the clutch;
circuitry that is configured to control the engine, the electric motor, and the clutch actuator, wherein:
the circuitry is configured to control the clutch actuator such that
the clutch becomes a disengaged state when stopping the engine and driving the electric motor, and
the clutch becomes an engaged state when driving the engine;
the variable throttle valve includes an association body that is configured to operate in association with a power transmitting shaft that rotates when the engine drives or in association with the clutch; and
the variable throttle valve is configured to increase the opening degree by a state change of the association body, the state change being caused by the mode transition.

3. The hybrid vehicle according to claim 2, wherein:
the association body is a rod that is configured to move in an axial direction in association with the clutch and includes a valve element portion; and
the opening degree of the variable throttle valve is configured to change by the movement of the valve element portion that moves by the movement of the rod.

4. The hybrid vehicle according to claim 2, wherein:
at least one of the engine or the transmission includes a case that covers an outer peripheral surface of a portion of the power transmitting shaft;
an annular gap is between the outer peripheral surface of the power transmitting shaft and the case;
the case includes as the transmission lubricating oil passage:
an inflow passage that communicates with the common oil passage and faces the annular gap, and an outflow passage that communicates with the transmission internal space and faces the annular gap;

the power transmitting shaft includes a through hole that extends in a radial direction of the power transmitting shaft and faces the annular gap;

the variable throttle valve includes the annular gap and the power transmitting shaft; and the variable throttle valve is configured to decrease the opening degree when the power transmitting shaft rotates, and increase the opening degree when the power transmitting shaft stops.

5. The hybrid vehicle according to claim 4, further comprising a phase adjuster that, when stopping the power transmitting shaft, is configured to bring the power transmitting shaft into a phase in which the through hole coincides with the inflow passage and the outflow passage.

* * * * *